United States Patent
Zhang et al.

(10) Patent No.: US 11,310,428 B2
(45) Date of Patent: Apr. 19, 2022

(54) CAMERA SHOOTING METHOD AND MOBILE TERMINAL

(71) Applicant: VIVO MOBILE COMMUNICATION CO., LTD., Dongguan (CN)

(72) Inventors: Kaiwei Zhang, Dongguan (CN); Conghua Fu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 260 days.

(21) Appl. No.: 16/607,775

(22) PCT Filed: Apr. 20, 2018

(86) PCT No.: PCT/CN2018/083938
§ 371 (c)(1),
(2) Date: Oct. 24, 2019

(87) PCT Pub. No.: WO2018/196695
PCT Pub. Date: Nov. 1, 2018

(65) Prior Publication Data
US 2020/0053287 A1    Feb. 13, 2020

(30) Foreign Application Priority Data

Apr. 27, 2017   (CN) .......................... 201710286977.8

(51) Int. Cl.
*H04N 5/232*     (2006.01)
*H04N 5/247*     (2006.01)

(52) U.S. Cl.
CPC ..... *H04N 5/23287* (2013.01); *H04N 5/23258* (2013.01); *H04N 5/247* (2013.01)

(58) Field of Classification Search
CPC .............. H04N 5/247; H04N 5/23258; H04N 5/23287; H04N 5/2258; H04N 5/144–145; G01C 19/00–728
(Continued)

(56) References Cited

U.S. PATENT DOCUMENTS

| | | |
|---|---|---|
| 5,459,542 A | 10/1995 | Fujiwara et al. |
| 2006/0251410 A1 | 11/2006 | Trutna |

(Continued)

FOREIGN PATENT DOCUMENTS

| | | |
|---|---|---|
| CN | 1912685 A | 2/2007 |
| CN | 1917587 A | 2/2007 |

(Continued)

OTHER PUBLICATIONS

1st Chinese Office Action for Chinese Application No. 201710286977.8, dated Aug. 16, 2018 (Aug. 16, 2018)—9 pages (English translation—6 pages).

(Continued)

*Primary Examiner* — Xi Wang
(74) *Attorney, Agent, or Firm* — Culhane Meadows PLLC; Stephen J. Weed

(57) ABSTRACT

A camera shooting method and a mobile terminal are provided. The mobile terminal includes a dual camera module and a motion sensor connected with the dual camera module, the motion sensor is configured to detect an angular velocity and/or acceleration, two cameras in the dual camera module constitutes respective anti-shaking components along with the motion sensor, so as to use the same motion sensor to collect shaking information of the mobile terminal. Thus, the dual camera module of the mobile terminal may collect the shaking information of the mobile terminal by using the same motion sensor, so that each camera of the dual camera module has an anti-shaking function.

10 Claims, 7 Drawing Sheets

(58) Field of Classification Search
USPC .................. 348/208.1, 208.99; 396/54
See application file for complete search history.

(56) References Cited

U.S. PATENT DOCUMENTS

| | | | |
|---|---|---|---|
| 2007/0036530 | A1 | 2/2007 | Nakagomi |
| 2008/0004073 | A1 | 1/2008 | John et al. |
| 2012/0293672 | A1 | 11/2012 | Nonaka et al. |
| 2014/0118256 | A1 | 5/2014 | Sonoda et al. |
| 2017/0150047 | A1* | 5/2017 | Jung .................. H04N 5/23258 |
| 2018/0109710 | A1* | 4/2018 | Lee ...................... H04N 5/2254 |
| 2020/0053287 | A1 | 2/2020 | Zhang et al. |

FOREIGN PATENT DOCUMENTS

| | | |
|---|---|---|
| CN | 101131608 A | 2/2008 |
| CN | 102754023 A | 10/2012 |
| CN | 102883099 A | 1/2013 |
| CN | 103414844 A | 11/2013 |
| CN | 104967785 A | 10/2015 |
| CN | 105629427 A | 6/2016 |
| CN | 105847701 A | 8/2016 |
| CN | 106060367 A | 10/2016 |
| CN | 106210544 A | 12/2016 |
| CN | 106254771 A | 12/2016 |
| CN | 106444220 A | 2/2017 |
| CN | 107040722 A | 8/2017 |
| JP | 2006178307 A | 7/2006 |
| WO | 2016156996 A1 | 10/2016 |

OTHER PUBLICATIONS

Chinese Search Report for Chinese Application No. 201710286977.8, dated Nov. 9, 2017 (Nov. 9, 2017)—6 pages (English translation—4 pages).
Extended European Search Report for European Application No. 18791249.8, dated Apr. 3, 2020 (Apr. 3, 2020)—8 pages.
International Search Report and Written Opinion for International Application No. PCT/CN2018/083938, dated Nov. 7, 2019 (Nov. 7, 2019)—10 pages (English translation—7 pages).
Wang Xiaxiao et al.: "The Development of Image Stabilization Technique and Measurement for Digital Camera", Electronic Testing, No. 21, 2016, pp. 67-70, Guangdong, Guangzhou, China, Nov. 1, 2016 (4 pages).
European Office Action for European Application No. 18791249.8, dated Jul. 29, 2021 (Jul. 29, 2021)—6 pages.

* cited by examiner

CAMERA SHOOTING METHOD AND MOBILE TERMINAL

CROSS-REFERENCE TO RELATED APPLICATION

This application is the U.S. national phase of PCT Application No. PCT/CN2018/083938 filed on Apr. 20, 2018, which claims a priority to Chinese Patent Application No. 201710286977.8 filed in China on Apr. 27, 2017, the disclosure of which is incorporated herein in its entirety by reference.

TECHNICAL FIELD

The present disclosure relates to communication technologies, and in particular, relates to a camera shooting method and a mobile terminal.

BACKGROUND

With development and progress of science and technology, a communication technology has obtained a rapid development and a considerable progress. With improvement of the communication technology, a popularity of intelligent electronic products has been increased to an unprecedented level. More and more intelligent terminals or mobile terminals have become an indispensable part of people's lives, such as smart phones, smart televisions (TVs) and computers.

With popularity of the mobile terminals, users are demanding more functions and higher performances of mobile terminals, such as an audio function, a photography function, a video shooting function and a fast charging function, which have become essential functions of intelligent terminals or the mobile terminals.

At present, more and more users are accustomed to using the mobile terminals to take photos or videos, especially in a case of a growing popularity of dual camera terminals. But in a conventional mobile terminal with two cameras, only one of the cameras has an anti-shaking function, which results in a shooting ghosting and a blur of the other camera when performing camera shooting due to shake. Contents captured by the two cameras have a poor image quality when performing image synthesis and processing.

SUMMARY

Embodiments of the present disclosure provide a camera shooting method and a mobile terminal to solve problems that in a conventional mobile terminal with two cameras, only one of the cameras has an anti-shaking function, which results in a shooting ghosting and a blur of the other camera when performing camera shooting due to shake, and contents captured by the two cameras have a poor image quality when performing image synthesis and processing.

In a first aspect, embodiments of the present disclosure provide a camera shooting method applied to a mobile terminal, wherein the mobile terminal includes a dual camera module, a motion sensor connected with the dual camera module, and a processor connected with the dual camera module and the motion sensor, the motion sensor is configured to detect at least angular velocity or acceleration of two axes. The method includes: detecting, by the motion sensor, first shaking information of the mobile terminal at a first time point, wherein the first shaking information includes a first shaking angle of the mobile terminal; adjusting a shooting angle of a first camera in the dual camera module based on the first shaking angle; detecting, by the motion sensor, second shaking information of the mobile terminal at a second time point, wherein the second shaking information includes a second shaking angle of the mobile terminal; adjusting a shooting angle of a second camera in the dual camera module based on the second shaking angle; and performing camera shooting by using the adjusted first camera and the adjusted second camera.

In a second aspect, embodiments of the present disclosure also provide a mobile terminal, including a dual camera module, a motion sensor connected with the dual camera module, and a processor connected with the dual camera module and the motion sensor, the motion sensor is configured to detect at least angular velocity or acceleration of two axes. The mobile terminal further including: a first detecting module, configured to detect first shaking information of the mobile terminal at a first time point by using the motion sensor, wherein the first shaking information includes a first shaking angle of the mobile terminal; a first adjusting module, configured to adjust a shooting angle of a first camera in the dual camera module based on the first shaking angle; a second detecting module, configured to detect second shaking information of the mobile terminal at a second time point by using the motion sensor, wherein the second shaking information includes a second shaking angle of the mobile terminal; a second adjusting module, configured to adjust a shooting angle of a second camera in the dual camera module based on the second shaking angle; a camera shooting module, configured to perform camera shooting by using the adjusted first camera and the adjusted second camera.

In a third aspect, embodiments of the present disclosure also provide a mobile terminal, including: a dual camera module and a motion sensor connected with the dual camera module, the motion sensor is configured to detect an angular velocity and/or acceleration, the mobile terminal further including: a memory, a processor and a computer program stored in the memory and capable of running on the processor, the processor is configured to execute the computer program, to perform the camera shooting method described above.

In the camera shooting method and the mobile terminal of the embodiments of the present disclosure, the mobile terminal includes a dual camera module, a motion sensor connected with the dual camera module, and a processor connected with the dual camera module and the motion sensor, the motion sensor is configured to detect at least angular velocity or acceleration of two axes. First shaking information of the mobile terminal at a first time point is detected by the motion sensor, wherein the first shaking information includes a first shaking angle of the mobile terminal; a shooting angle of a first camera in the dual camera module is adjusted based on the first shaking angle; second shaking information of the mobile terminal at a second time point is detected by the motion sensor, wherein the second shaking information includes a second shaking angle of the mobile terminal; a shooting angle of a second camera in the dual camera module is adjusted based on the second shaking angle; and camera shooting is performed by using the adjusted first camera and the adjusted second camera. Thus, the dual camera module of the mobile terminal may collect the shaking information of the mobile terminal with the same motion sensor, so that both cameras of the dual camera module have an anti-shaking function, a shooting ghosting and a blur of two cameras due to shake when shooting are prevented, contents captured by the two cameras are clear, and an image quality in image synthesis and processing is improved.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain other drawings without any creative effort.

FIG. 4 is a schematic diagram illustrating a structure of a first adjusting module shown in FIG. 3a;

FIG. 6 is a schematic diagram illustrating a structure of a second adjusting module shown in FIG. 3a;

DETAILED DESCRIPTION

The technical solutions in the embodiments of the present disclosure will be described hereinafter clearly and completely with reference to the drawings of the embodiments of the present disclosure. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
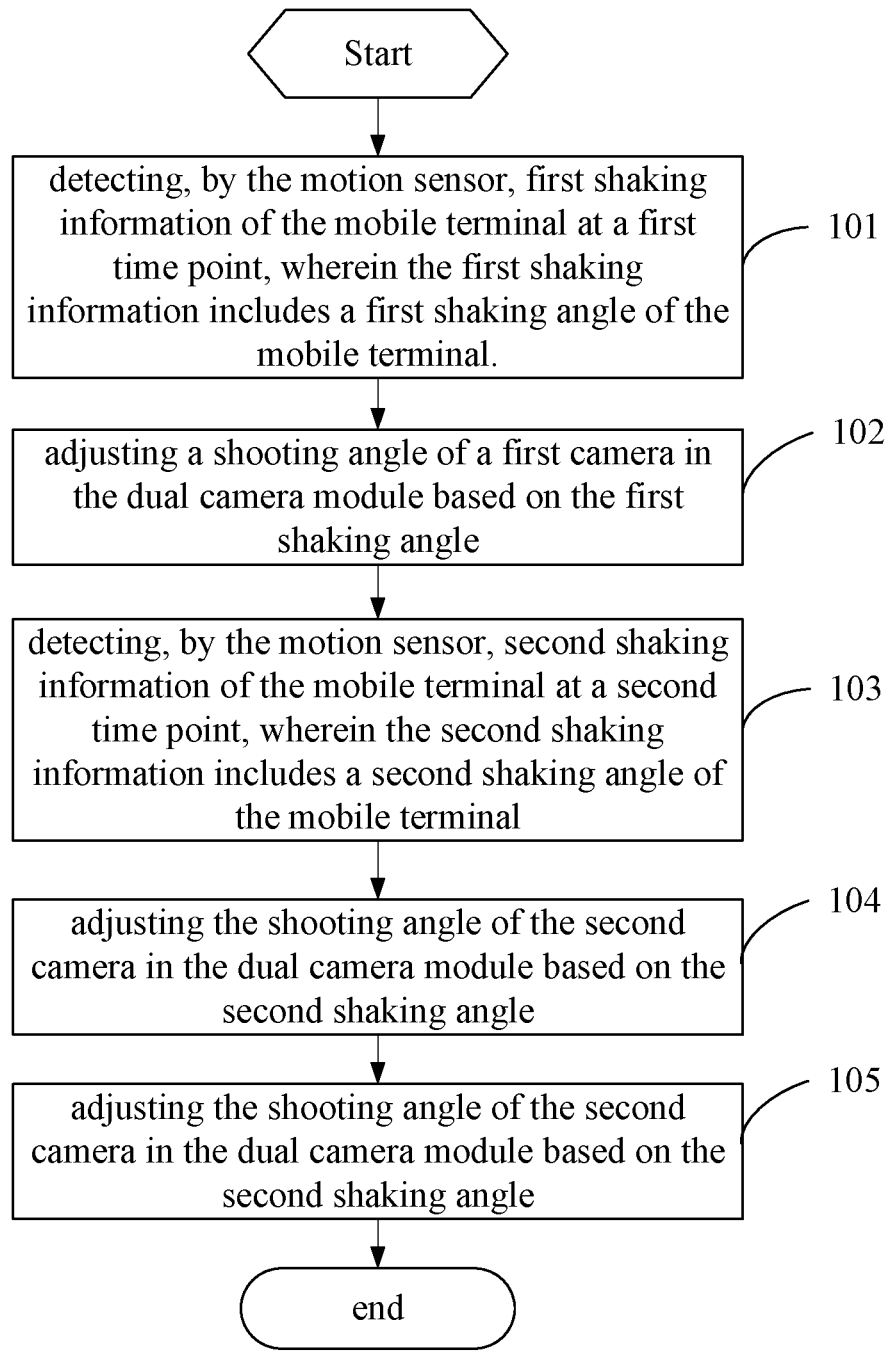
FIG. 1 is a flow chart illustrating a camera shooting method according to one embodiment of the present disclosure.

Referring to FIG. 1, FIG. 1 is a flow chart illustrating a camera shooting method according to one embodiment of the present disclosure. The method is applied to a mobile terminal, the mobile terminal includes a dual camera module, a motion sensor connected with the dual camera module, and a processor connected with the dual camera module and the motion sensor, the motion sensor is configured to detect at least angular velocity or acceleration of two axes. As shown in FIG. 1, the method includes following steps.

Step 101: detecting, by the motion sensor, first shaking information of the mobile terminal at a first time point, wherein the first shaking information includes a first shaking angle of the mobile terminal.

With progress of science and technology, it has become an indispensable way of camera shooting in people's life and a necessary function of the mobile terminals for users to take photos or take videos with the mobile terminals. In addition, in order to improve a camera shooting function of the mobile terminals, more and more mobile terminals have dual camera, how to use the dual camera to take better pictures or videos has become an urgent problem to be solved.

When a user shoots with the mobile terminal, most of them shoot by holding the mobile terminal with a hand, which inevitably causes a shaking. Therefore, in the above step, when the user shoots with the mobile terminal, the motion sensor in the mobile terminal may be used for detecting in real time a camera shooting action performed by the user holding the mobile terminal with a hand. When the shaking occurs, first shaking information of the mobile terminal at a first time point may be detected.

The first shaking information at least includes a first shaking angle of the mobile terminal.

The shaking of the mobile terminal may refer to that the mobile terminal moves within a small range, instead of moving a long distance within a large range.

The motion sensor may be a sensor in the mobile terminal that may detect a movement of the mobile terminal in different directions, such as an acceleration sensor, a gravity sensor, a gravity acceleration sensor, a gyroscope, etc.

Step 102: adjusting a shooting angle of a first camera in the dual camera module based on the first shaking angle.

In this step, when the mobile terminal detects the shaking of the mobile terminal with the motion sensor and obtains the shaking angle in the shaking information of the mobile terminal, the mobile terminal may adjust the first camera of the dual camera module according to a change of the shaking angle, so as to adjust the shooting angle of the first camera, thereby an effect of the shaking on the camera shooting may be offset.

Generally, when the shaking angle of the mobile terminal is obtained, the shooting angle of the first camera may be adjusted at an angle opposite to the shaking angle, so as to offset the shaking angle.

The shooting angle of the first camera may be adjusted through a lens of the first camera. The shooting angle may be adjusted by adjusting a position or an inclination angle of the lens, or the shooting angle may be adjusted by adjusting a position or an inclination angle of a photosensitive unit in the first camera, which is not specifically defined herein.

Step 103: detecting, by the motion sensor, second shaking information of the mobile terminal at a second time point, wherein the second shaking information includes a second shaking angle of the mobile terminal.

In this step, when the user shoots with the mobile terminal, a motion sensor in the mobile terminal may be used for detecting in real time a camera shooting action performed by the user holding the mobile terminal with a hand. When the shaking occurs, second shaking information of the mobile terminal at a second time point may be detected.

The second shaking information at least includes a second shaking angle of the mobile terminal.

The shaking of the mobile terminal may refer to that the mobile terminal moves within a small range, instead of moving a long distance within a large range.

Due to different shooting mechanisms, shooting rules, shooting mode and other requirements, the second time and the first time may be a same time point or different time points. For example, if two cameras in the dual-camera module shoot at a same time, then time points for detecting a shaking are the same, i.e., the first time point and the second time point are the same time point. And if two cameras in the dual-camera module shoot at different time points when shooting due to a shooting requirement, i.e., one of the two cameras shoots first, and the other shoots later, time points for detecting a shaking are different from each other, that is to say, the first time point and the second time point are different time points.

Step 104: detecting, by the motion sensor, second shaking information of the mobile terminal at a second time point, wherein the second shaking information includes a second shaking angle of the mobile terminal.

In this step, when the mobile terminal detects the shaking of the mobile terminal with the motion sensor and obtains the shaking angle in the shaking information of the mobile terminal, the mobile terminal may adjust the second camera of the dual camera module according to a change of the shaking angle, so as to adjust the shooting angle of the second camera, thereby an effect of the shaking on the camera shooting may be offset.

Generally, when the shaking angle of the mobile terminal is obtained, the shooting angle of the second camera may be adjusted at an angle opposite to the shaking angle, so as to offset the shaking angle.

The shooting angle of the second camera may be adjusted through a lens of the second camera. The shooting angle may be adjusted by adjusting a position or an inclination angle of the lens, or the shooting angle may be adjusted by adjusting a position or an inclination angle of a photosensitive unit in the second camera, which is not specifically defined herein.

Step 105: performing camera shooting by using the adjusted first camera and the adjusted second camera.

In the step, when the shooting angles of the first camera and the second camera have been adjusted properly, the mobile terminal may control the dual camera module to shoot with the adjusted first camera and the adjusted second camera.

In the embodiment of the present disclosure, the mobile terminal may be any mobile terminal having a dual camera module or a motion sensor, such as a mobile phone, a tablet personal computer, a laptop computer, a Personal Digital Assistant (PDA), a Mobile Internet Device (MID), a wearable device, etc.

In the camera shooting method of the embodiments of the present disclosure, first shaking information of the mobile terminal at a first time point is detected by the motion sensor, wherein the first shaking information includes a first shaking angle of the mobile terminal; a shooting angle of a first camera in the dual camera module is adjusted based on the first shaking angle; second shaking information of the mobile terminal at a second time point is detected by the motion sensor, wherein the second shaking information includes a second shaking angle of the mobile terminal; a shooting angle of a second camera in the dual camera module is adjusted based on the second shaking angle; and camera shooting is performed by using the adjusted first camera and the adjusted second camera. Thus, the dual camera module of the mobile terminal may collect the shaking information of the mobile terminal with the same motion sensor, so that both cameras of the dual camera module have an anti-shaking function, a shooting ghosting and a blur of two cameras due to shake when shooting are prevented, contents captured by the two cameras are clear, and an image quality in image synthesis and processing is improved. Moreover, two cameras in the dual camera module may use the same motion sensor, which may also avoid an inconsistency in information detected by different sensors due to differences such as different materials of the sensors, and an anti-shaking accuracy may be improved. Furthermore, the dual camera module and the mobile terminal may use the same motion sensor to collect the shaking information of the mobile terminal. Thus, a design complexity of the mobile terminal may be reduced, a space of the mobile terminal may be saved and a design cost may be reduced, which conform to a development trend of thinning and lightening the mobile terminal.

Figure 2:
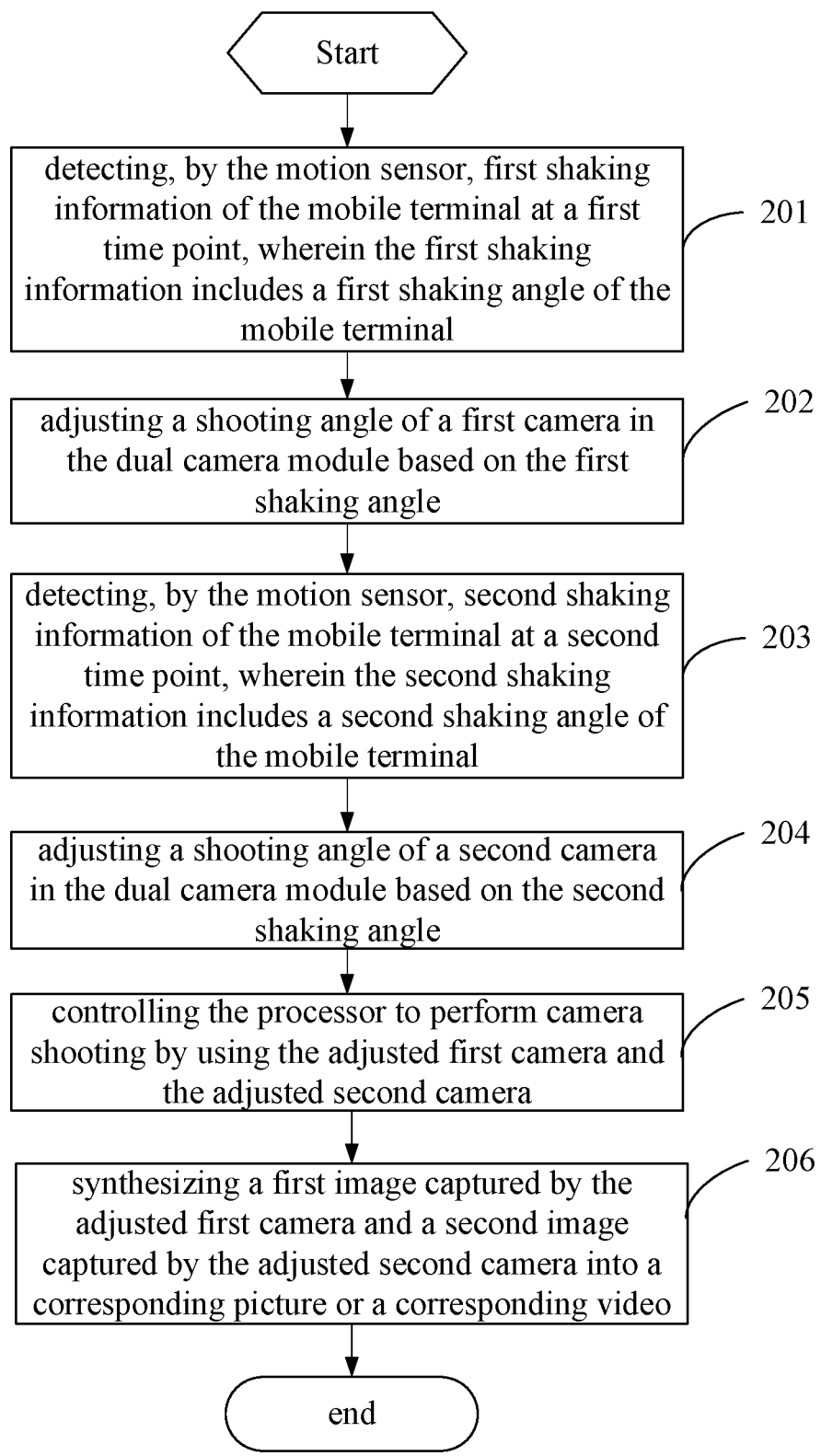
FIG. 2 is a flow chart illustrating a camera shooting method according to another embodiment of the present disclosure.

Referring to FIG. 2, FIG. 2 is a flow chart illustrating a camera shooting method according to another embodiment of the present disclosure. The method is applied to a mobile terminal, the mobile terminal includes a dual camera module, a motion sensor connected with the dual camera module, and a processor connected with the dual camera module and the motion sensor, the motion sensor is configured to detect at least angular velocity or acceleration of two axes. As shown in FIG. 2, the method includes following steps.

Step 201: detecting, by the motion sensor, first shaking information of the mobile terminal at a first time point, wherein the first shaking information includes a first shaking angle of the mobile terminal.

Step 202: adjusting a shooting angle of a first camera in the dual camera module based on the first shaking angle.

Step 203: detecting, by the motion sensor, second shaking information of the mobile terminal at a second time point, wherein the second shaking information includes a second shaking angle of the mobile terminal.

Step 204: adjusting a shooting angle of a second camera in the dual camera module based on the second shaking angle.

Step 205: performing camera shooting by using the adjusted first camera and the adjusted second camera.

Step 201, step 202, step 203, step 204 and step 205 are same as step 101, step 102, step 103, step 104 and step 105 in the embodiment shown in FIG. 1, respectively, and a description thereof will not be repeated herein.

Step 206: synthesizing a first image captured by the adjusted first camera and a second image captured by the adjusted second camera into a corresponding picture or a corresponding video.

In this step, when the mobile terminal shoots with the adjusted first camera and the adjusted second camera, and the first image is captured by the adjusted first camera, and the second image is captured by the adjusted second camera, the mobile terminal may synthesize the first image and the second image into a corresponding picture or a corresponding video.

Optionally, step 202 includes: firstly, adjusting, a position of a first optical element of the first camera in the dual camera module based on the first shaking angle, wherein the first optical element is a lens or a photosensitive element of the first camera.

In this step, after the motion sensor detects the shaking of the mobile terminal, and the first shaking angle of the mobile terminal at the first time, in order to adjust the shooting angle of the first camera of the dual camera module, the mobile terminal may adjust a position of the first optical element of the first camera according to the detected first shaking angle, so that the first optical element may be adjusted preliminarily, thereby the shooting angle of the first camera is adjusted, and an effect of the shaking on the mobile terminal is offset.

The first optical element may be a lens or a photosensitive element of the first camera.

Adjusting the position of the first optical element may refer to enable the first optical element to move in various directions to implement position change, or refer to enable an inclination angle of the first optical element to change, rotate the first optical element, or the like to implement position change while keeping an original position of the first optical element unchanged.

The position of the first optical element may be adjusted through a voice coil motor in the first camera.

Secondly, obtaining, a first displacement information of the first optical element whose position has been adjusted.

In this step, after the mobile terminal adjusts the position of the first optical element based on the shaking angle to complete the preliminary adjustment, the mobile terminal may obtain the first displacement information of the adjusted first optical element through detection, thereby determining whether the adjustment of the first optical element is appropriate.

The first displacement information of the first optical element may include a position of the adjusted first optical element, a direction and a distance of the first optical element when moving, etc.

The first displacement information of the first optical element may be obtained by detecting the first displacement information of the first optical element with a Hall sensor in the first camera.

Thirdly, calculating a first compensation angle of the first camera based on the first shaking angle and the first displacement information.

In practice, a rotation angle of the first camera and a theoretical rotation angle of the first camera may be inconsistent due to errors and tolerances of each component. In order to obtain a better photographic effect, in the step, after adjusting the angle of the first camera by adjusting the first optical element preliminarily, the mobile terminal may convert the first shaking angle and the first displacement information into a same unit of measurement according to the first shaking angle of the mobile terminal and the first displacement information of the first optical element after preliminary adjustment. Then a difference between an actual rotation angle of the first camera and the theoretical rotation angle of the first camera, i.e., the first compensation angle of the first camera, may be calculated.

The first compensation angle of the first camera may refer to an angle difference where the first camera should be but actually not adjusted to due to a difference between a position where the first camera should be adjusted to theoretically and a position preliminary adjusted based on the shaking angle.

Finally, performing compensation on the shooting angle of the first camera by using the first compensation angle.

In this step, after calculating and obtaining the first compensation angle of the first camera, the mobile terminal may use the first compensation angle, and further adjust the position of the first optical element based on a displacement information of the first optical element corresponding to the first compensation angle, thereby compensating the angle of the first camera to achieve a fine adjustment.

Optionally, for each coordinate axis in a coordinate system where the mobile terminal is located, calculating the first compensation angle of the first optical element based on the first shaking angle and the first displacement information includes the following steps.

Firstly, calculating a first rotation angle of the first camera on each coordinate axis based on the first displacement information.

In this step, according to the detected first displacement information of the first optical element, the mobile terminal may calculate and obtain an angle corresponding to the first displacement information to obtain the rotation angle of the first camera, and then obtain the first rotation angle of the first camera on each coordinate axis according to the rotation angle of the first camera.

Obtaining the first rotation angle of the first camera on each coordinate axis according to the rotation angle of the first camera, may be decomposing the rotation angle of the first camera into the respective component on each coordinate axis, and then the first rotation angle of the first camera on each coordinate axis may be obtained.

Secondly, calculating a difference between a component of the first shaking angle on each coordinate axis and the first rotation angle, and obtaining the first compensation angle of the first camera on each coordinate axis.

In this step, the mobile terminal may obtain the component of the first shaking angle of the mobile terminal on each coordinate axis based on the detected first shaking angle when the mobile terminal shakes, and then calculate a difference between the component of the first shaking angle on each coordinate axis and the first rotation angle on each coordinate axis. Then a deviation between the actual rotation angle and the theoretical rotation angle of the first camera, i.e., the first compensation angle that the first camera should be compensated on each coordinate axis, is obtained.

Obtaining a respective component of the first shaking angle on each coordinate axis according to the first shaking angle of the mobile terminal may be decomposing the first shaking angle into the respective component on each coordinate axis. Or, obtaining the respective component of the first shaking angle on each coordinate axis according to the first shaking angle of the mobile terminal may include that, the mobile terminal detects, when shake occurs, an angular velocity of the shake and shaking time, and then decomposes the angular velocity into angular velocities corresponding to respective coordinate axes, and subjects the angular velocities corresponding to respective coordinate axes to integral calculus during shaking, so as to obtain components of the first shaking angle on each coordinate axis.

For example, in an X-axis direction, the mobile terminal may firstly obtain angular velocity information $\omega_{x1}$ on the X-axis by decomposing an angle of the mobile terminal, and then calculate a shaking angle of the mobile terminal on the X-axis by integral calculus, such as $\theta_{x1}(t_1)=\theta_{x1}+\Delta t^*\omega_{x1}$, wherein $\theta_{x1}$ is an initial angle of the mobile terminal in the X-axis direction at time point $t_0$, $\theta_{x1}(t_1)$ is the shaking angle of the mobile terminal in the X-axis direction at time point $t_1$. And calculation methods for other coordinate axes are the same, which will not be repeated herein.

Then based on the first displacement information of the first optical element, a rotation angle $\theta_{x1\ HS}(t_1)$ of the camera on the X-axis is calculated, and a difference between the shaking angle of the mobile terminal on the X-axis and the rotation angle of the camera on the X-axis is calculated, so that an angle of the first camera that should be compensated on the X-axis, i.e., the first compensation angle, is obtained, such as $\theta_{x1\ err}(t_1)=\theta_{x1}(t_1)-\theta_{x1\ HS}(t_1)$, wherein $\theta_{x1\ err}(t_1)$ is the angle of the first camera that should be compensated on the X-axis.

The above is just an example on the X axis. Calculation methods for other coordinate axes are the same, which will not be repeated herein.

Optionally, Step 204 includes the following steps.

Firstly, adjusting a position of a second optical element of the second camera in the dual camera module based on the second shaking angle, wherein the second optical element is a lens or a photosensitive element of the second camera.

In this step, when the motion sensor detects the shaking of the mobile terminal, and detects the second shaking angle of the mobile terminal at the second time point, in order to adjust the shooting angle of the second camera of the dual camera module, the mobile terminal may adjust the position of the second optical element of the second camera according to the detected second shaking angle, so that the second optical element may be adjusted preliminarily, thereby the shooting angle of the second camera is adjusted, and an effect of the shaking on the camera shooting is offset.

The second optical element may be a lens or a photosensitive element of the second camera.

Adjusting the position of the second optical element may refer to a position change of the second optical element by moving it in various directions. It may also refer to a position change of the second optical element by changing an inclination angle or rotation, etc., while keeping an original position of the second optical element unchanged.

Adjusting the position of the second optical element may be adjusting a voice coil motor in the second camera.

Secondly, obtaining, a second displacement information of the second optical element whose position has been adjusted.

In this step, when the mobile terminal adjusts the position of the second optical element based on the shaking angle, after completing the preliminary adjustment, the mobile terminal may obtain the second displacement information of the adjusted second optical element through detection, thereby determining whether the adjustment of the second optical element is appropriate.

The second displacement information of the second optical element may include a position of the second optical element whose position has been adjusted, a direction and a distance of the second optical element when moving, etc.

The second displacement information of the second optical element may be obtained by detecting the second displacement information of the second optical element with a Hall sensor in the second camera.

Thirdly, calculating a second compensation angle of the second camera based on the second shaking angle and the second displacement information.

In practice, a rotation angle of the second camera and a theoretical rotation angle of the second camera may be inconsistent due to errors and tolerances of each component. In order to obtain a better photographic effect, in this step, after adjusting the angle of the second camera by adjusting the second optical element preliminarily, the mobile terminal may convert the second shaking angle and the second displacement information into a same unit of measurement according to the second shaking angle of the mobile terminal and the second displacement information of the second optical element after preliminary adjustment. Then a difference between an actual rotation angle of the second camera and the theoretical rotation angle, i.e., the second compensation angle of the second camera, may be calculated.

The second compensation angle of the second camera may refer to an angle difference where the second camera should be but actually not adjusted to due to a difference between a position where the second camera should be adjusted to theoretically and a position preliminary adjusted based on the shaking angle.

Finally, performing compensation on the shooting angle of the second camera by using the second compensation angle.

In this step, after calculating and obtaining the second compensation angle of the second camera, the mobile terminal may use the second compensation angle, and further adjust the position of the second optical element based on a displacement information of the second optical element corresponding to the second compensation angle, thereby compensating the angle of the second camera to achieve a fine adjustment.

Optionally, for each coordinate axis in a coordinate system where the mobile terminal is located, calculating the second compensation angle of the second optical element based on the second shaking angle and second displacement information includes the following steps.

Firstly, calculating a second rotation angle of the second camera on each coordinate axis based on the second displacement information.

In this step, according to the detected second displacement information of the second optical element, the mobile terminal may calculate and obtain an angle corresponding to the second displacement information to obtain the rotation angle of the second camera, and then obtain the first rotation angle of the first camera on each coordinate axis according to the rotation angle of the first camera.

Obtaining the first rotation angle of the first camera on each coordinate axis according to the rotation angle of the first camera, may be decomposing the rotation angle of the first camera into the respective component on each coordinate axis, and then the first rotation angle of the first camera on each coordinate axis may be obtained.

Secondly, calculating a difference between a component of the second shaking angle on each coordinate axis and the second rotation angle, and obtaining the second compensation angle of the second camera on each coordinate axis.

In this step, the mobile terminal may obtain the component of the first shaking angle of the mobile terminal on each coordinate axis based on the detected second shaking angle when the mobile terminal shakes, and then calculate a difference between the component of the second shaking angle on each coordinate axis and the second rotation angle on each coordinate axis. Then a deviation between the actual rotation angle and the theoretical rotation angle of the second camera, i.e., the second compensation angle that the second camera should be compensated on each coordinate axis, is obtained.

Obtaining a respective component of the first shaking angle on each coordinate axis according to the first shaking angle of the mobile terminal may be decomposing the first shaking angle into the respective component on each coordinate axis. Or, obtaining the respective component of the first shaking angle on each coordinate axis according to the first shaking angle of the mobile terminal may include that, the mobile terminal detects, when shake occurs, an angular velocity of the shake and shaking time, and then decomposes the angular velocity into angular velocities corresponding to respective coordinate axes, and subjects the angular velocities corresponding to respective coordinate axes to integral calculus during shaking, so as to obtain components of the first shaking angle on each coordinate axis.

For example, in an X-axis direction, the mobile terminal may firstly obtain angular velocity information $\omega_{x2}$ on the X-axis by decomposing an angle of the mobile terminal, and then calculate a shaking angle of the mobile terminal on the X-axis by integral calculus, such as $\theta_{x2}(t_1)=\theta_{x2}+\omega_{x2}$, wherein $\theta_{x2}$ is an initial angle of the mobile terminal in the X-axis direction at time point $t_0$, $\theta_{x2}(t_1)$ is the shaking angle of the mobile terminal in the X-axis direction at time point $t_1$. And calculation methods for other coordinate axes are the same, which will not be repeated herein.

Then based on the second displacement information of the second optical element, a rotation angle $\theta_{x2\ Hs}(t_1)$ of the camera on the X-axis is calculated, and a difference between the shaking angle of the mobile terminal on the X-axis and the rotation angle of the camera on the X-axis is calculated, so that an angle of the first camera that should be compensated on the X-axis, i.e., the first compensation angle, is obtained, such as $\theta_{x2\_err}(t_1)=\theta_{x2}(t_1)-\theta_{x2\_HS}(t_1)$, wherein $\theta_{x2\_err}(t_1)$ is the angle of the first camera that should be compensated on the X-axis.

The above is just an example on the X axis. Calculation methods for other coordinate axes are the same, which will not be repeated herein.

Optionally, after step 206, the method further includes: detecting motion information of the mobile terminal at a third time point with the motion sensor; and controlling a content displayed in a display interface of the mobile terminal to rotate according to the motion information.

In this step, when the mobile terminal shoots with the adjusted first camera and the adjusted second camera, and has synthesized the captured images into a corresponding picture or a corresponding video, if a user needs to view the synthesized picture or video on the mobile terminal, the mobile terminal may detect motion information of the mobile terminal at a third time point with the motion sensor, such as information on whether the mobile terminal is rotated, or whether the mobile terminal is in a landscape mode or a portrait mode, etc., then a processor of the mobile terminal controls, based on the motion information, the content displayed in the user interface of the mobile terminal to rotate according to operations of the mobile terminal.

In other words, the processor of the mobile terminal and the motion sensor may constitute a user interface sensor control system of the mobile terminal.

The third time point may be a time point of a conversion between the landscape mode and the portrait mode of the display screen of the mobile terminal caused by that the mobile terminal moves or rotates, etc. when a user uses the mobile terminal by holding the mobile terminal with a hand.

In the camera shooting method of the embodiments of the present disclosure, first shaking information of the mobile terminal at a first time point is detected by the motion sensor, wherein the first shaking information includes a first shaking angle of the mobile terminal; a shooting angle of a first camera in the dual camera module is adjusted based on the first shaking angle; second shaking information of the mobile terminal at a second time point is detected by the motion sensor, wherein the second shaking information includes a second shaking angle of the mobile terminal; a shooting angle of a second camera in the dual camera module is adjusted based on the second shaking angle; and camera shooting is performed by using the adjusted first camera and the adjusted second camera; and a first image captured by the adjusted first camera and a second image captured by the adjusted second camera are synthesized into a corresponding picture or a corresponding video. Thus, the dual camera module of the mobile terminal may collect the shaking information of the mobile terminal with the same motion sensor, so that both cameras of the dual camera module have an anti-shaking function, a shooting ghosting and a blur of two cameras due to shake when shooting are prevented, contents captured by the two cameras are clear, and an image quality in image synthesis and processing is improved. Moreover, two cameras in the dual camera module may use the same motion sensor, which may also avoid an inconsistency in information detected by different sensors due to differences such as different materials of the sensors, and an anti-shaking accuracy may be improved. Furthermore, the dual camera module and the mobile terminal may use the same motion sensor to collect the shaking information of the mobile terminal. Thus, a design complexity of the mobile terminal may be reduced, a space of the mobile terminal may be saved and a design cost may be reduced, which conform to a development trend of thinning and lightening the mobile terminal.

Figure 3A:
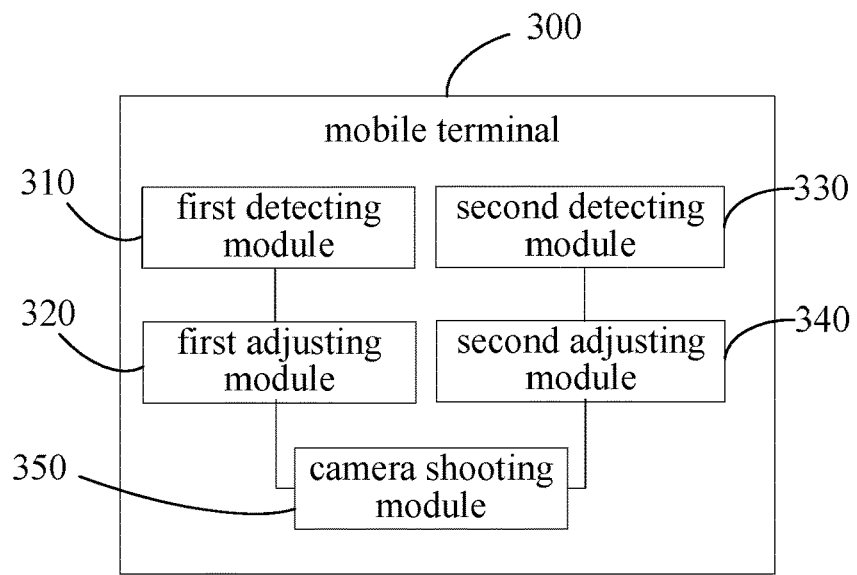
FIG. 3a is a schematic diagram illustrating a structure of a mobile terminal according to one embodiment of the present disclosure.
Figure 3B:
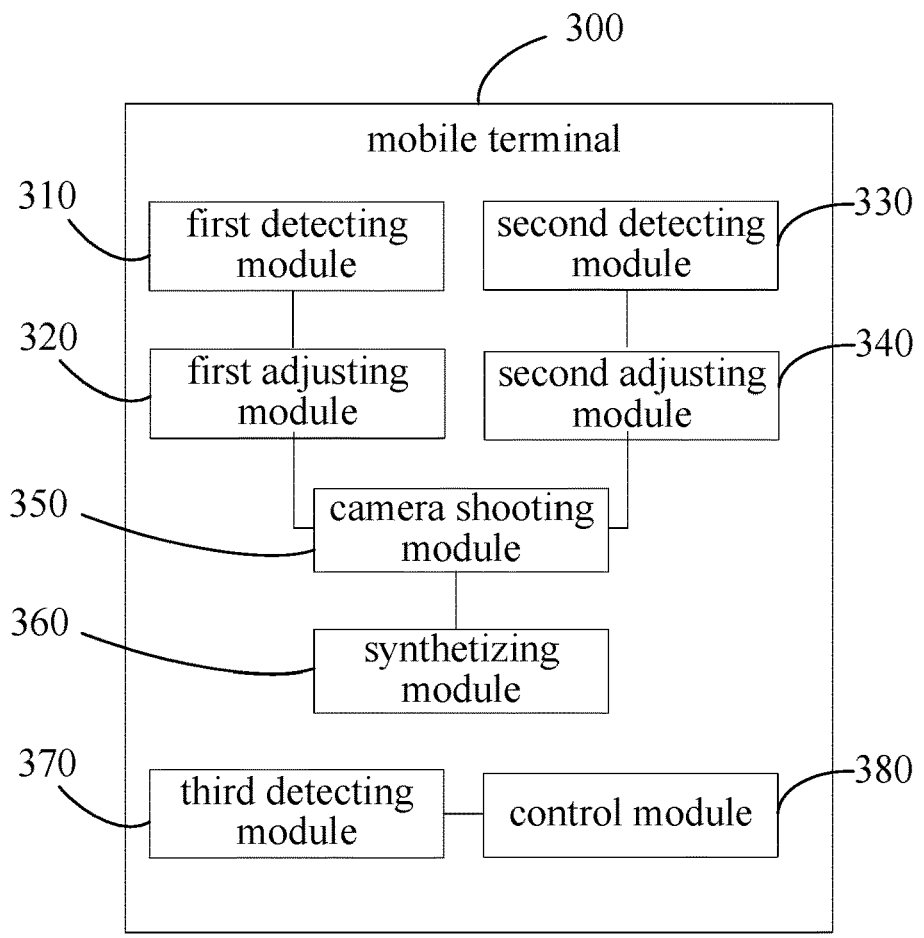
FIG. 3b is a schematic diagram illustrating a structure of a mobile terminal according to another embodiment of the present disclosure.
Figure 4:
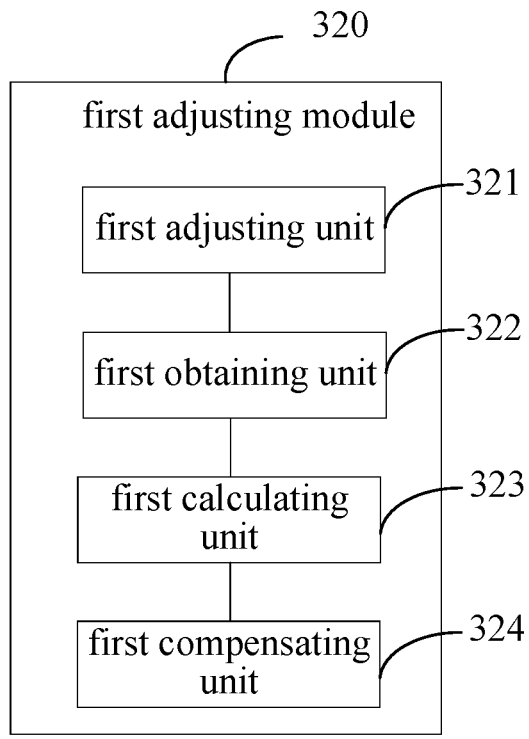
Figure 5:
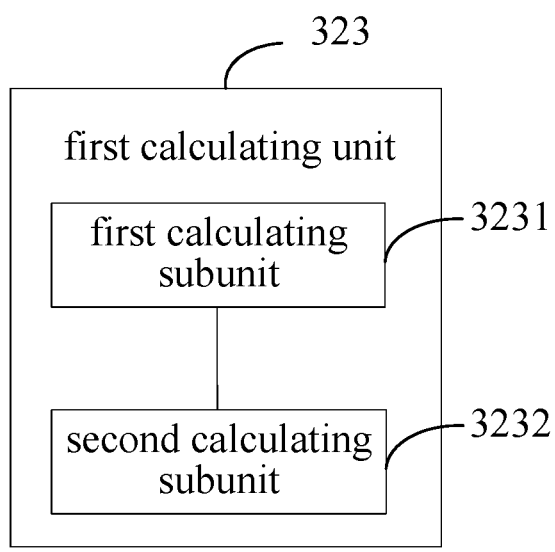
FIG. 5 is a schematic diagram illustrating a structure of a first calculating module shown in FIG. 4.
Figure 6:
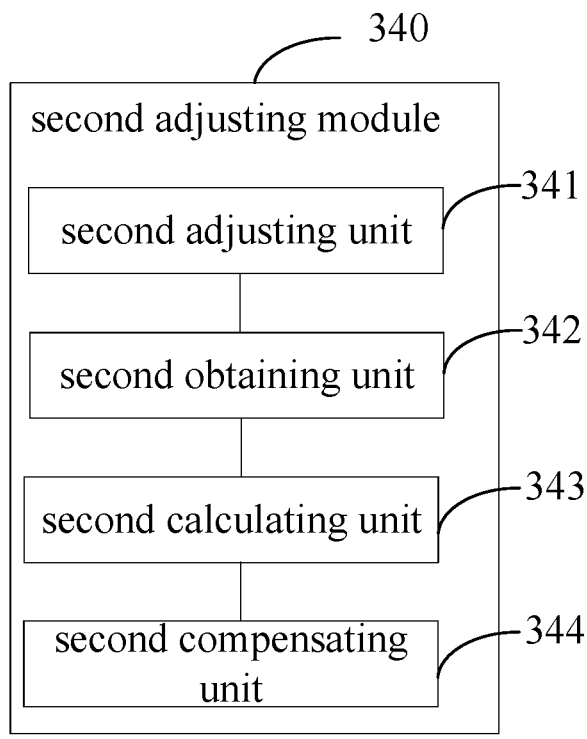
Figure 7:
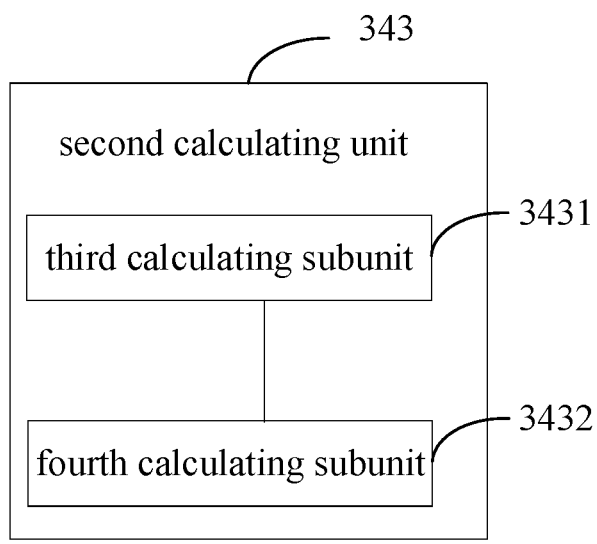
FIG. 7 is a schematic diagram illustrating a structure of a second calculating module shown in FIG. 6.

Referring to FIGS. 3-6, FIG. 3*a* is a schematic diagram illustrating a structure of a mobile terminal according to one embodiment of the present disclosure, FIG. 3*b* is a schematic diagram illustrating a structure of a mobile terminal according to another embodiment of the present disclosure, FIG. 4 is a schematic diagram illustrating a structure of a first adjusting module shown in FIG. 3*a*, FIG. 5 is a schematic diagram illustrating a structure of a first calculating module shown in FIG. 4, FIG. 6 is a schematic diagram illustrating a structure of a second adjusting module shown in FIG. 3*a*, FIG. 7 is a schematic diagram illustrating a structure of a second calculating module shown in FIG. 6. A mobile terminal 300 includes: a dual camera module, a motion sensor connected with the dual camera module, and a processor connected with the dual camera module and the motion sensor, the motion sensor is configured to detect at least angular velocity or acceleration of two axes. As shown in FIG. 3*a*, the mobile terminal 300 further includes following modules.

A first detecting module 310, configured to detect first shaking information of the mobile terminal at a first time point by using the motion sensor, wherein the first shaking information includes a first shaking angle of the mobile terminal.

A first adjusting module 320, configured to adjust a shooting angle of a first camera in the dual camera module based on the first shaking angle.

A second detecting module 330, configured to detect second shaking information of the mobile terminal at a second time point by using the motion sensor, wherein the second shaking information includes a second shaking angle of the mobile terminal.

A second adjusting module 340, configured to adjust a shooting angle of a second camera in the dual camera module based on the second shaking angle.

A camera shooting module 350, configured to perform camera shooting by using the adjusted first camera and the adjusted second camera.

Optionally, as shown in FIG. 4, the first adjusting module 320 includes following units.

A first adjusting unit 321, configured to adjust a position of a first optical element of the first camera in the dual camera module based on the first shaking angle of the first shaking information, wherein the first optical element is a lens or a photosensitive element of the first camera.

A first obtaining unit 322, configured to obtain a first displacement information of the first optical element whose position has been adjusted.

A first calculating unit 323, configured to calculate a first compensation angle of the first camera based on the first shaking angle and the first displacement information.

A first compensating unit 324, configured to perform compensation on the shooting angle of the first camera by using the first compensation angle.

Optionally, as shown in FIG. 5, for each coordinate axis in a coordinate system where the mobile terminal 300 is located, the first calculating unit 323 includes following subunits.

A first calculating subunit 3231, configured to calculate a first rotation angle of the first camera on each coordinate axis based on the first displacement information.

A second calculating subunit 3232, configured to, for each coordinate axis in a coordinate system where the mobile terminal is located, calculate a difference between a respective component of the first shaking angle on each coordinate axis and the first rotation angle, to obtain the first compensation angle of the first camera on each coordinate axis.

Optionally, as shown in FIG. 6, the second adjusting module 340 includes following units.

A second adjusting unit 341, configured to adjust a position of a second optical element of the second camera in the dual camera module based on the second shaking angle of the second shaking information, wherein the second optical element is a lens or a photosensitive element of the second camera.

A second obtaining unit 342, configured to obtain a second displacement information of the second optical element whose position has been adjusted.

A second calculating unit 343, configured to calculate a second compensation angle of the second camera based on the second shaking angle and the second displacement information.

A second compensating unit 344, configured to perform compensation on the shooting angle of the second camera by using the second compensation angle.

Optionally, as shown in FIG. 7, for each coordinate axis in a coordinate system where the mobile terminal is located, the second calculating unit 343 includes following subunits.

A third calculating subunit 3431, configured to calculate a second rotation angle of the second camera on each coordinate axis based on the second displacement information.

A fourth calculating subunit 3432, configured to calculate a difference between a respective component of the second shaking angle on each coordinate axis and the second rotation angle, to obtain the second compensation angle of the second camera on each coordinate axis.

Optionally, as shown in FIG. 3b, the mobile terminal 300 further includes a following module.

A synthesizing module 360, configured to synthesize a first image captured by the adjusted first camera and a second image captured by the adjusted second camera into a corresponding picture or a corresponding video.

Optionally, as shown in FIG. 3b, the mobile terminal 300 further includes following modules.

A third detecting module 370, configured to detect motion information of the mobile terminal at a third time point by using the motion sensor.

A control module 380, configured to control a content displayed in a display interface of the mobile terminal to rotate according to the motion information.

The mobile terminal 300 may implement various processes of the mobile terminal implemented in the method embodiments of FIG. 1 and FIG. 2, which will not be repeated herein for the sake of simplicity.

In the mobile terminal of the embodiments of the present disclosure, first shaking information of the mobile terminal at a first time point is detected by the motion sensor, wherein the first shaking information includes a first shaking angle of the mobile terminal; a shooting angle of a first camera in the dual camera module is adjusted based on the first shaking angle; second shaking information of the mobile terminal at a second time point is detected by the motion sensor, wherein the second shaking information includes a second shaking angle of the mobile terminal; a shooting angle of a second camera in the dual camera module is adjusted based on the second shaking angle; and camera shooting is performed by using the adjusted first camera and the adjusted second camera. Thus, the dual camera module of the mobile terminal may collect the shaking information of the mobile terminal with the same motion sensor, so that both cameras of the dual camera module have an anti-shaking function, a shooting ghosting and a blur of two cameras due to shake when shooting are prevented, contents captured by the two cameras are clear, and an image quality in image synthesis and processing is improved. Moreover, two cameras in the dual camera module may use the same motion sensor, which may also avoid an inconsistency in information detected by different sensors due to differences such as different materials of the sensors, and an anti-shaking accuracy may be improved. Furthermore, the dual camera module and the mobile terminal may use the same motion sensor to collect the shaking information of the mobile terminal. Thus, a design complexity of the mobile terminal may be reduced, a space of the mobile terminal may be saved and a design cost may be reduced, which conform to a development trend of thinning and lightening the mobile terminal.

Figure 8:
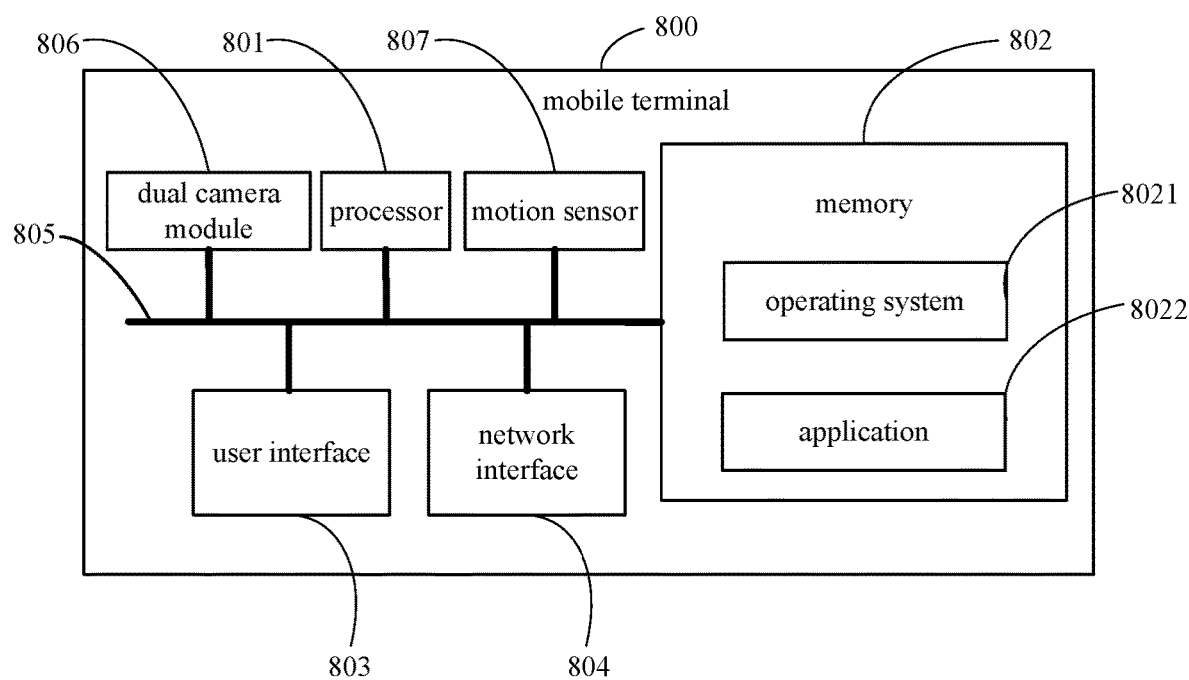
FIG. 8 is a schematic diagram illustrating a structure of a mobile terminal according to another embodiment of the present disclosure.

Referring to FIG. 8, FIG. 8 is a schematic diagram illustrating a structure of a mobile terminal according to another embodiment of the present disclosure. As shown in FIG. 8, a mobile terminal 800 includes: at least one processor 801, a memory 802, at least one network interface 804 and a user interface 803. Each component of the mobile terminal 800 is coupled together through a bus system 805. It should be appreciated that, the bus system 805 is to realize connection communication between these components. The bus system 805 includes not only a data bus, but also a power bus, a control bus and a state signal bus. But for the sake of clarity, in FIG. 8, all kinds of buses are marked as the bus system 805.

The mobile terminal 800 also includes a dual camera module 806 and a motion sensor 807, the dual camera module 806 and the dual speed motion sensor 807 are connected with the processor 801 through the bus system 805.

The user interface 803 may include a display, a keyboard, or a pointing device (e.g., a mouse, a track ball, a touch pad, a touch screen, etc.).

It should be appreciated that, the memory 802 in the embodiments of the present disclosure may be a volatile memory or a non-volatile memory, or include both of the volatile memory and the non-volatile memory. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), or a flash memory. The volatile memory may be a Random Access Memory (RAM), which serves as an external cache. Various RAM are available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), Enhanced Synchronous Dynamic Random Access Memory (ESDRAM), Synch Link Dynamic Random Access Memory (SLDRAM) and Direct Rambus Random Access Memory (DRRAM), which is illustrated by examples, not in a restricting way. The memory 802 of the systems and methods described in the present disclosure is intended to include, but is not limited to, the memory described above and any other suitable types of memories.

In some embodiments, the memory 802 stores following elements, executable modules or data structures, or their subsets, or their extension sets: an operating system 8021 and an application 8022.

The operating system 8021 includes various system programs, such as a framework layer, a core library layer, a driver layer, etc., used for implementing various basic services and dealing with hardware-based tasks. The application 8022 includes various applications, such as a media player, a browser, etc., used for implementing various application services. A program implementing the method of the embodiments of the present disclosure may be included in the application 8022.

In the embodiments of the present disclosure, the processor 801 is configured to call a program or an instruction stored in the memory 802, in particular, a program or an instruction stored in the application 8022 to implement following steps.

Detecting, through the motion sensor, first shaking information of the mobile terminal at a first time point, wherein the first shaking information includes a first shaking angle of the mobile terminal; adjusting a shooting angle of a first camera in the dual camera module based on the first shaking angle; detecting, through the motion sensor, second shaking information of the mobile terminal at a second time point, wherein the second shaking information includes a second shaking angle of the mobile terminal; adjusting a shooting angle of a second camera in the dual camera module based on the second shaking angle; and performing camera shooting by using the adjusted first camera and the adjusted second camera.

The methods disclosed in the above-mentioned embodiments of the present disclosure may be applied to or implemented by the processor 801. The processor 801 may be an integrated circuit chip capable of processing signals. In an implementation, the steps of the above method may be implemented by an integrated logic circuit in a form of hardware in the processor 801 or instructions in a form of software. The processor 801 may be a general processor, a Digital Signal Processor (DSP), an Application Specific Integrated Circuit (ASIC), a Field Programmable Gate Array (FPGA) or other programmable logic devices, discrete gates or transistor logic devices, discrete hardware components. The methods, steps and logical block diagrams in the embodiments of the present disclosure may be implemented or executed. The general processor may be a microprocessor or any conventional processor. The steps of the method in the embodiments of the present disclosure may be directly embodied in the execution of a hardware decoding processor or in combination of hardware and software modules in the decoding processor. The software modules may be located in a RAM, a flash memory, a read-only memory, a programmable read-only memory or an electrical erasable programmable memory, a register and other known memory media in the art. The storage medium may be located in the memory 802, and the processor 801 reads information in the memory 802, and implements the steps of the above methods with the hardware in the processor 801.

It should be appreciated that, the embodiments described above may be implemented with hardware, software, firmware, middleware, microcode or a combination thereof. For a hardware implementation, a processing unit may be implemented in one or more Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), general processors, controllers, microcontrollers, microprocessors, other electronic units or combinations thereof for performing the functions described in the application.

For a software implementation, the techniques described in the present disclosure may be implemented by modules (such as processes, functions, etc.) performing the functions described in the present disclosure. Software code may be stored in the memory and executed by the processor. The memory may be implemented in or outside the processor.

Optionally, the processor 801 is further configured to implement following steps.

Adjusting a position of a first optical element of the first camera in the dual camera module based on the first shaking angle, wherein the first optical element is a lens or a photosensitive element of the first camera.

Obtaining a first displacement information of the first optical element whose position has been adjusted; calculating a first compensation angle of the first camera based on the first shaking angle and the first displacement information; performing compensation on the shooting angle of the first camera by using the first compensation angle.

Optionally, for each coordinate axis in a coordinate system where the mobile terminal is located, the processor 801 is further configured to implement following steps.

Calculating a first rotation angle of the first camera on each coordinate axis based on the first displacement information; and calculating a difference between a component of the first shaking angle on each coordinate axis and the first rotation angle, to obtain the first compensation angle of the first camera on each coordinate axis.

Optionally, the processor 801 is further configured to implement following steps.

Adjusting a position of a second optical element of the second camera in the dual camera module based on the second shaking angle, wherein the second optical element is a lens or a photosensitive element of the second camera; obtaining a second displacement information of the second optical element whose position has been adjusted; calculating a second compensation angle of the second camera based on the second shaking angle and the second displacement information; and performing compensation on the shooting angle of the second camera by using the second compensation angle.

Optionally, for each coordinate axis in a coordinate system where the mobile terminal is located, the processor 801 is further configured to implement following steps.

Calculating a second rotation angle of the second camera on each coordinate axis based on the second displacement information; calculating a difference between a component of the second shaking angle on each coordinate axis and the second rotation angle, to obtain the second compensation angle of the second camera on each coordinate axis.

Optionally, the processor 801 is further configured to implement a following step.

Synthesizing a first image captured by the adjusted first camera and a second image captured by the adjusted second camera into a corresponding picture or a corresponding video.

Optionally, the processor 801 is further configured to implement following steps.

Detecting, through the motion sensor, motion information of the mobile terminal at a third time point; and controlling a content displayed in a display interface of the mobile terminal to rotate according to the motion information.

The mobile terminal 800 may implement various processes of the mobile terminal implemented in the embodiments described above, which will not be repeated herein for the sake of simplicity.

In the mobile terminal of the embodiments of the present disclosure, first shaking information of the mobile terminal at a first time point is detected by the motion sensor, wherein the first shaking information includes a first shaking angle of the mobile terminal; a shooting angle of a first camera in the dual camera module is adjusted based on the first shaking angle; second shaking information of the mobile terminal at a second time point is detected by the motion sensor, wherein the second shaking information includes a second shaking angle of the mobile terminal; a shooting angle of a second camera in the dual camera module is adjusted based on the second shaking angle; and camera shooting is performed by using the adjusted first camera and the adjusted second camera. Thus, the dual camera module of the mobile terminal may collect the shaking information of the mobile terminal with the same motion sensor, so that both cameras of the dual camera module have an anti-shaking function, a shooting ghosting and a blur of two cameras due to shake when shooting are prevented, contents captured by the two cameras are clear, and an image quality in image synthesis and processing is improved. Moreover, two cameras in the dual camera module may use the same motion sensor, which may also avoid an inconsistency in information detected by different sensors due to differences such as different materials of the sensors, and an anti-shaking accuracy may be improved. Furthermore, the dual camera module and the mobile terminal may use the same motion sensor to collect the shaking information of the mobile terminal. Thus, a design complexity of the mobile terminal may be reduced, a space of the mobile terminal may be saved and a design cost may be reduced, which conform to a development trend of thinning and lightening the mobile terminal.

Figure 9:
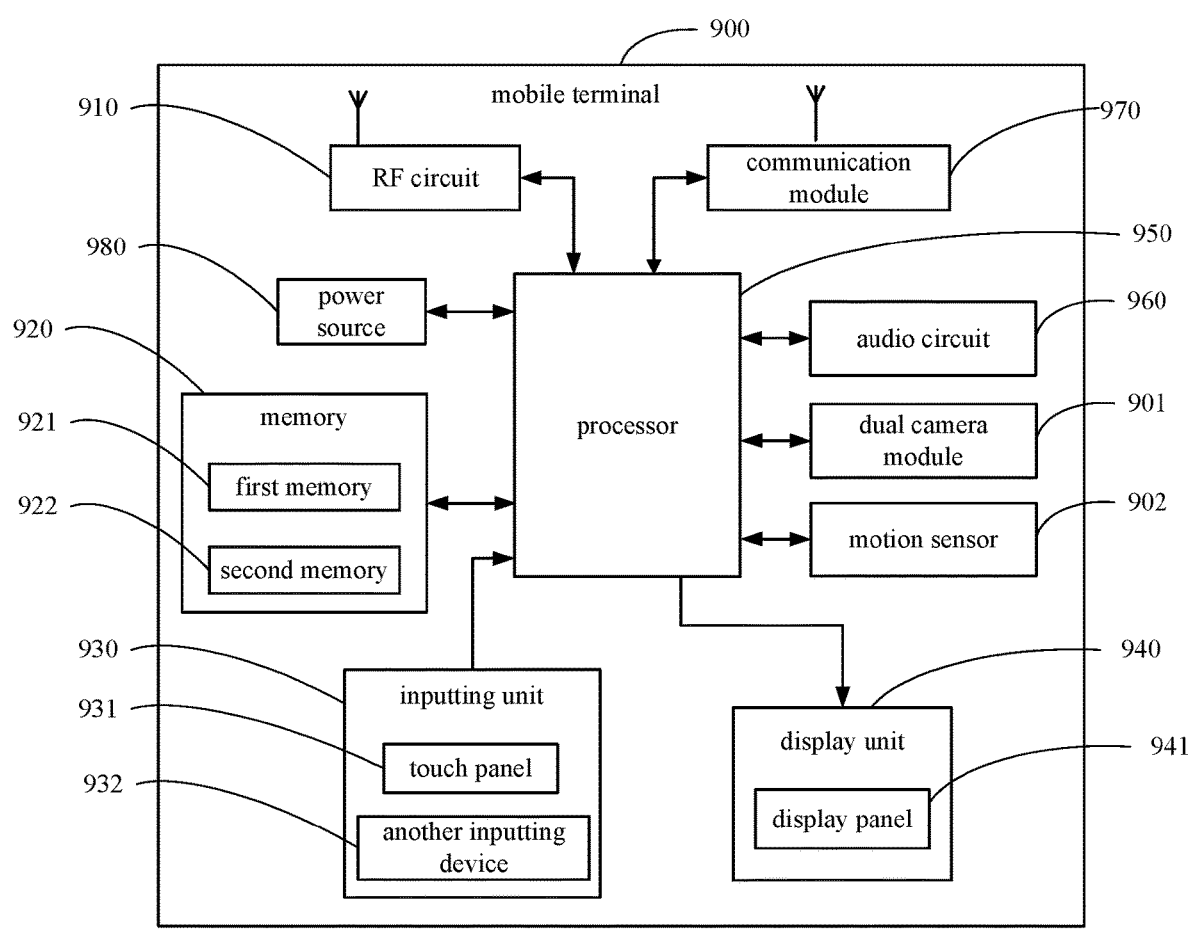
FIG. 9 is a schematic diagram illustrating a structure of a mobile terminal according to another embodiment of the present disclosure.

Referring to FIG. 9, FIG. 9 is a schematic diagram of a structure of a mobile terminal according to the embodiments of the present disclosure. As shown in FIG. 9, a mobile terminal 900 includes a Radio Frequency (RF) circuit 910, a memory 920, an inputting unit 930, a display unit 940, a processor 950, an audio circuit 960, a communication module 970 and a power source 980.

The mobile terminal 900 also includes a dual camera module 901 and a motion sensor 902, the dual camera module 901 and the motion sensor 902 are connected with the processor 950.

The inputting unit 930 may receive numeral or character information inputted by the user, and generate signal input related with user configuration and function control of the mobile terminal 900. Specifically, in the embodiments of the present disclosure, the inputting unit 930 may include a touch panel 931. The touch panel 931 is also called a touch screen, and may collect a touch operation performed by a user on or near the touch panel 931 (e.g., the user performs an operation on the touch panel 931 with any suitable object or accessory such as a finger and a stylus), and drive a corresponding connection mobile device according to a preset program. Optionally, the touch panel 931 may include a touch detecting mobile device and a touch controller. The touch detecting mobile device may detect a touch position of the user, detect a signal generated based on the touch operation, and transmit the signal to the touch controller. The touch controller may receive touch information from the touch detecting mobile device, convert the touch information into a coordinate of touch point, transmit the coordinate of the touch point to the processor 950, and receive and execute a command sent by the processor 950. In addition, the touch panel 931 may be implemented by multiple modes such as a resistive mode, a capacitive mode, an infrared mode or a surface acoustic wave mode. Besides the touch panel 931, the inputting unit 930 may further include another inputting device 932. The inputting device 932 may include, but is not limited to, one or more of a physical keyboard, a function key (such as a volume control key, a switch key, etc.), a trackball, a mouse and a joystick.

The display unit 940 may display information inputted by the user or information provided to the user and various menu interfaces of the mobile terminal 900. The display unit 940 may include a display panel 941, which may be a Liquid Crystal Display (LCD) panel or an Organic Light-Emitting Diode (OLED) panel.

It should be noted that the touch panel 931 may cover the display panel 941 to form a touch display screen. When a touch operation on or near the touch display screen is detected, and the touch operation is transmitted to the processor 950 to determine a type of a touch event. The processor 950 then provides a corresponding visual output on the touch display screen according to the type of the touch event.

The touch display screen includes an application interface display region and a common control display region. The application interface display region and the common control display region may be arranged in various manners, such as an upper and lower alignment, a left and right alignment, or other alignments distinguishing the two display regions. The application interface display region may display an interface of the application. Each interface may include an interface element such as at least one application icon and/or a widget desktop control. The application interface display region may also be an empty interface without any content. The common control display region may display a control with a high usage rate, such as a setting button, an interface number, a scroll bar, a telephone icon and other application icons. The touch screen in the embodiments of the present disclosure is a flexible screen, and both sides of the flexible screen are coated with an organic transparent conductive film of carbon nanotubes.

The processor 950 is a control center of the mobile terminal 900. The processor 950 connects all parts of a mobile phone by various interfaces and lines. The processor 950 performs various functions and data processing of the mobile terminal 900 by running or executing software programs and/or modules stored in a first memory 921 and calling data stored in a second memory 922, so as to monitor the mobile terminal 900 as a whole. Optionally, the processor 950 may include one or more processing units.

In the embodiments of the present disclosure, the processor 950 is configured to call the software programs and/or the modules stored in the first memory 921 and/or the data in the second memory 922 to implement following steps.

Detecting, through the motion sensor, first shaking information of the mobile terminal at a first time point, wherein the first shaking information includes a first shaking angle of the mobile terminal; adjusting a shooting angle of a first camera in the dual camera module based on the first shaking angle; detecting, through the motion sensor, second shaking information of the mobile terminal at a second time point, wherein the second shaking information includes a second shaking angle of the mobile terminal; adjusting a shooting angle of a second camera in the dual camera module based on the second shaking angle; and performing camera shooting by using the adjusted first camera and the adjusted second camera.

Optionally, the processor 950 is further configured to implement following steps.

Adjusting a position of a first optical element of the first camera in the dual camera module based on the first shaking angle, wherein the first optical element is a lens or a photosensitive element of the first camera.

Obtaining a first displacement information of the first optical element whose position has been adjusted; calculating a first compensation angle of the first camera based on the first shaking angle and the first displacement information; performing compensation on the shooting angle of the first camera by using the first compensation angle.

Optionally, for each coordinate axis in a coordinate system where the mobile terminal is located, the processor 950 is further configured to implement following steps.

Calculating a first rotation angle of the first camera on each coordinate axis based on the first displacement information; and calculating a difference between a component of the first shaking angle on each coordinate axis and the first rotation angle, to obtain the first compensation angle of the first camera on each coordinate axis.

Optionally, the processor 950 is further configured to implement following steps.

Adjusting a position of a second optical element of the second camera in the dual camera module based on the second shaking angle, wherein the second optical element is a lens or a photosensitive element of the second camera; obtaining a second displacement information of the second optical element whose position has been adjusted; calculating a second compensation angle of the second camera based on the second shaking angle and the second displacement information; and performing compensation on the shooting angle of the second camera by using the second compensation angle.

Optionally, for each coordinate axis in a coordinate system where the mobile terminal is located, the processor 950 is further configured to implement following steps.

Calculating a second rotation angle of the second camera on each coordinate axis based on the second displacement information; calculating a difference between a component of the second shaking angle on each coordinate axis and the second rotation angle, to obtain the second compensation angle of the second camera on each coordinate axis.

Optionally, the processor 950 is further configured to implement a following step.

Synthesizing a first image captured by the adjusted first camera and a second image captured by the adjusted second camera into a corresponding picture or a corresponding video.

Optionally, the processor 950 is further configured to implement following steps.

Detecting, through the motion sensor, motion information of the mobile terminal at a third time point; and controlling a content displayed in a display interface of the mobile terminal to rotate according to the motion information.

The mobile terminal 900 may implement various processes of the mobile terminal implemented in the embodiments described above, which will not be repeated herein for the sake of simplicity.

In the mobile terminal of the embodiments of the present disclosure, first shaking information of the mobile terminal at a first time point is detected by the motion sensor, wherein the first shaking information includes a first shaking angle of the mobile terminal; a shooting angle of a first camera in the dual camera module is adjusted based on the first shaking angle; second shaking information of the mobile terminal at a second time point is detected by the motion sensor, wherein the second shaking information includes a second shaking angle of the mobile terminal; a shooting angle of a second camera in the dual camera module is adjusted based on the second shaking angle; and camera shooting is performed by using the adjusted first camera and the adjusted second camera. Thus, the dual camera module of the mobile terminal may collect the shaking information of the mobile terminal with the same motion sensor, so that both cameras of the dual camera module have an anti-shaking function, a shooting ghosting and a blur of two cameras due to shake when shooting are prevented, contents captured by the two cameras are clear, and an image quality in image synthesis and processing is improved. Moreover, two cameras in the dual camera module may use the same motion sensor, which may also avoid an inconsistency in information detected by different sensors due to differences such as different materials of the sensors, and an anti-shaking accuracy may be improved. Furthermore, the dual camera module and the mobile terminal may use the same motion sensor to collect the shaking information of the mobile terminal. Thus, a design complexity of the mobile terminal may be reduced, a space of the mobile terminal may be saved and a design cost may be reduced, which conform to a development trend of thinning and lightening the mobile terminal.

A person skilled in the art may understands that, the units and the algorithm steps of the examples in the embodiments of the present disclosure may be implemented in a form of electronic hardware, or combination of the electronic hardware and the computer software. Whether the units and the algorithm steps are implemented in a form of hardware or software depends on specific applications and design constraints of the technical solutions. Professional technicians may use different methods to implement the described functions for each particular application, and the implementations should not be considered beyond the scope of the present disclosure.

A person skilled in the art may clearly understand that for the sake of convenience and simplicity of description, the specific working processes of the systems, devices and units described above may refer to corresponding processes in the embodiments of the methods described above, and will not be repeated herein.

In embodiments of the present disclosure, it should be understood that the disclosed devices and methods may be implemented in other ways. For example, the device embodiments described above are merely illustrative. For example, the division of the units described above is only a logical functional division. In practice, there may be other ways of division, e.g., multiple units or components may be combined or integrated into another system, or some features may be ignored or not implemented. On another hand, a coupling or a direct coupling or a communication connection shown or discussed may be an indirect coupling or a communication connection through some interfaces, devices or units, and may be in electrical, mechanical or other forms.

The unit described as respective separation components may or may not be physically separated, and the component displayed as a unit may or may not be a physical unit, that is, it may be located in one place or may be distributed over multiple network units. Some or all of the units may be selected according to actual needs to achieve the purpose of the solution of the embodiment of the present disclosure.

In addition, the functional units in various embodiments of the present disclosure may be integrated in one processing unit, may be physically present separately from each other, or may be integrated in one unit by two or more units.

When the functions are implemented in the form of software function units and sold or used as an independent product, the functions may be stored in a computer-readable storage medium. Based on the understanding, the technical solution of the present disclosure, or a part of the technical solution contributing to the prior art, or a part of the technical solution, may be embodied in a form of a software product. The computer software product is stored in a storage medium, including several instructions to make a computer device (e.g., a personal computer, a server, or a network device, etc.) perform all or part of the steps of the method described in various embodiments of the present disclosure. The aforementioned storage medium includes: a universal serial bus disk, a mobile hard disk, a ROM, a RAM, a magnetic disk or an optical disk, and another medium that may store program code.

The above are merely embodiments of the present disclosure, but a protection scope of the present disclosure is not limited thereto. It should be appreciated that a person skilled in the art may make further modifications and improvements without departing from the spirit of the present disclosure, and these modifications and improvements shall also fall within the scope of the present disclosure. Therefore, the protection scope of the present disclosure shall be subject to the protection scope of the claims.

What is claimed is:

1. A camera shooting method applied to a mobile terminal, wherein the mobile terminal comprises a dual camera module and a motion sensor connected with the dual camera module, the motion sensor is configured to detect an angular velocity and/or acceleration, and the camera shooting method comprises:
   detecting, by the motion sensor, first shaking information of the mobile terminal at a first time point, wherein the first shaking information comprises a first shaking angle of the mobile terminal;
   adjusting a shooting angle of a first camera in the dual camera module based on the first shaking angle;
   detecting, by the motion sensor, second shaking information of the mobile terminal at a second time point, wherein the second shaking information comprises a second shaking angle of the mobile terminal;
   adjusting a shooting angle of a second camera in the dual camera module based on the second shaking angle; and
   performing camera shooting by using the adjusted first camera and the adjusted second camera,
   wherein adjusting the shooting angle of the first camera in the dual camera module based on the first shaking angle comprises:
   adjusting a position of a first optical element of the first camera in the dual camera module based on the first shaking angle, wherein the first optical element is a lens or a photosensitive element of the first camera;
   obtaining a first displacement information of the adjusted first optical element;
   calculating a first compensation angle of the first camera based on the first shaking angle and the first displacement information; and
   performing compensation on the shooting angle of the first camera by using the first compensation angle,
   wherein for each coordinate axis in a coordinate system where the mobile terminal is located, calculating the first compensation angle of the first camera based on the first shaking angle and the first displacement information comprises:
   calculating a first rotation angle of the first camera on the each coordinate axis based on the first displacement information; and
   calculating a difference between a component of the first shaking angle on the each coordinate axis and the first rotation angle, to obtain the first compensation angle of the first camera on the each coordinate axis.

2. The camera shooting method according to claim 1, wherein adjusting the shooting angle of the second camera in the dual camera module based on the second shaking angle comprises:
   adjusting a position of a second optical element of the second camera in the dual camera module based on the second shaking angle, wherein the second optical element is a lens or a photosensitive element of the second camera;
   obtaining a second displacement information of the adjusted second optical element;
   calculating a second compensation angle of the second camera based on the second shaking angle and the second displacement information; and
   performing compensation on the shooting angle of the second camera by using the second compensation angle.

3. The camera shooting method according to claim 2, wherein for each coordinate axis in a coordinate system where the mobile terminal is located, calculating the second compensation angle of the second camera based on the second shaking angle and second displacement information comprises:
   calculating a second rotation angle of the second camera on the each coordinate axis based on the second displacement information;
   calculating a difference between a component of the second shaking angle on the each coordinate axis and the second rotation angle, to obtain the second compensation angle of the second camera on the each coordinate axis.

4. The camera shooting method according to claim 1, further comprising:
   after performing the camera shooting by using the adjusted first camera and the adjusted second camera,
   synthesizing a first image captured by the adjusted first camera and a second image captured by the adjusted second camera into a corresponding picture or a corresponding video.

5. The camera shooting method according to claim 4, further comprising:
   after synthesizing the first image captured by the adjusted first camera and the second image captured by the adjusted second camera into the corresponding picture or the corresponding video,
   detecting, by the motion sensor, motion information of the mobile terminal at a third time point; and
   controlling a content displayed in a display interface of the mobile terminal to rotate according to the motion information.

6. A mobile terminal, comprising:
   a dual camera module and a motion sensor connected with the dual camera module, the motion sensor is configured to detect an angular velocity and/or acceleration,
   wherein the mobile terminal further comprises: a memory, a processor, and a computer program being stored in the memory and capable of running on the processor, the processor is configured to execute the computer program to:
   detect, by the motion sensor, first shaking information of the mobile terminal at a first time point, wherein the first shaking information comprises a first shaking angle of the mobile terminal;
   adjust a shooting angle of a first camera in the dual camera module based on the first shaking angle;
   detect, by the motion sensor, second shaking information of the mobile terminal at a second time point, wherein the second shaking information comprises a second shaking angle of the mobile terminal;
   adjust a shooting angle of a second camera in the dual camera module based on the second shaking angle; and perform camera shooting by using the adjusted first camera and the adjusted second camera, wherein the processor configured to execute the computer program to adjust the shooting angle of the first camera in the dual camera module based on the first shaking angle, is further configured to execute the computer program to:

adjust a position of a first optical element of the first camera in the dual camera module based on the first shaking angle, wherein the first optical element is a lens or a photosensitive element of the first camera;

obtain a first displacement information of the adjusted first optical element;

calculate a first compensation angle of the first camera based on the first shaking angle and the first displacement information; and perform compensation on the shooting angle of the first camera by using the first compensation angle, wherein the processor configured to execute the computer program to, for each coordinate axis in a coordinate system where the mobile terminal is located, calculate the first compensation angle of the first camera based on the first shaking angle and the first displacement information is further configured to execute the computer program to:

calculate a first rotation angle of the first camera on the each coordinate axis based on the first displacement information, and calculate a difference between a component of the first shaking angle on the each coordinate axis and the first rotation angle, to obtain the first compensation angle of the first camera on the each coordinate axis.

7. The mobile terminal according to claim 6, wherein the processor configured to execute the computer program to execute the computer program to adjust the shooting angle of the second camera in the dual camera module based on the second shaking angle, is further configured to execute the computer program to:

adjust a position of a second optical element of the second camera in the dual camera module based on the second shaking angle, wherein the second optical element is a lens or a photosensitive element of the second camera;

obtain a second displacement information of the adjusted second optical element;

calculate a second compensation angle of the second camera based on the second shaking angle and the second displacement information; and perform compensation on the shooting angle of the second camera by using the second compensation angle.

8. The mobile terminal according to claim 7, wherein the processor configured to execute the computer program to, for each coordinate axis in a coordinate system where the mobile terminal is located, calculate the second compensation angle of the second camera based on the second shaking angle and second displacement information, is further configured to execute the computer program to:

calculate a second rotation angle of the second camera on the each coordinate axis based on the second displacement information;

calculate a difference between a component of the second shaking angle on the each coordinate axis and the second rotation angle, to obtain the second compensation angle of the second camera on the each coordinate axis.

9. The mobile terminal according to claim 6, wherein the processor is further configured to execute the computer program to:

after performing the camera shooting by using the adjusted first camera and the adjusted second camera, synthesize a first image captured by the adjusted first camera and a second image captured by the adjusted second camera into a corresponding picture or a corresponding video.

10. The mobile terminal according to claim 9, wherein the processor is further configured to execute the computer program to:

after synthesizing the first image captured by the adjusted first camera and the second image captured by the adjusted second camera into the corresponding picture or the corresponding video, detect, by the motion sensor, motion information of the mobile terminal at a third time point; and control a content displayed in a display interface of the mobile terminal to rotate according to the motion information.

* * * * *